(12) United States Patent
Sejimo

(10) Patent No.: US 11,465,285 B2
(45) Date of Patent: Oct. 11, 2022

(54) ROBOT SYSTEM, CONTROL APPARATUS, AND CONTROL METHOD FOR ROBOT

(71) Applicant: Seiko Epson Corporation, Tokyo (JP)

(72) Inventor: Isamu Sejimo, Azumino (JP)

(73) Assignee: SEIKO EPSON CORPORATION

( * ) Notice: Subject to any disclaimer, the term of this patent is extended or adjusted under 35 U.S.C. 154(b) by 231 days.

(21) Appl. No.: 16/874,750

(22) Filed: May 15, 2020

(65) Prior Publication Data
US 2020/0361089 A1 Nov. 19, 2020

(30) Foreign Application Priority Data
May 16, 2019 (JP) .............................. JP2019-092676

(51) Int. Cl.
*B25J 9/16* (2006.01)
*B25J 13/08* (2006.01)
*B25J 9/00* (2006.01)
*B25J 19/02* (2006.01)

(52) U.S. Cl.
CPC ............ *B25J 9/1674* (2013.01); *B25J 9/0009* (2013.01); *B25J 9/1694* (2013.01); *B25J 13/085* (2013.01); *B25J 19/02* (2013.01)

(58) Field of Classification Search
CPC ........ B25J 9/009; B25J 9/1602; B25J 9/1656; B25J 9/1674; B25J 9/1679; B25J 9/1694; B25J 13/085; B25J 13/087; B25J 13/088; B25J 15/0608; B25J 19/02; G05B 2219/40202

See application file for complete search history.

(56) References Cited

U.S. PATENT DOCUMENTS

| | | | | |
|---|---|---|---|---|
| 2015/0277426 | A1* | 10/2015 | Ogata ................... | G05B 19/404 901/46 |
| 2016/0167231 | A1* | 6/2016 | Nakayama ............. | B25J 9/1694 700/255 |
| 2016/0346935 | A1* | 12/2016 | Nakayama ............. | B25J 9/1674 |
| 2018/0133902 | A1 | 5/2018 | Inoue et al. | |
| 2021/0252713 | A1* | 8/2021 | Mimura ................... | B25J 13/06 |

FOREIGN PATENT DOCUMENTS

| | | | | |
|---|---|---|---|---|
| JP | 2014124740 A | * | 7/2014 | |
| JP | 2015123520 A | * | 7/2015 | ............ B25J 9/1676 |
| JP | 2018-080941 A | | 5/2018 | |
| JP | 2018-103312 A | | 7/2018 | |

\* cited by examiner

*Primary Examiner* — Dale Moyer
(74) *Attorney, Agent, or Firm* — Harness, Dickey & Pierce, P.L.C.

(57) ABSTRACT

A robot system includes a robot collaboratively acting with a human, a force sensor provided in the robot and detecting a force, a control unit decelerating or stopping an action of the robot based on output from the force sensor, a first temperature sensor detecting a temperature of the force sensor, and an execution unit performing warm-up operation in the robot until output from the first temperature sensor reaches a first target value.

9 Claims, 7 Drawing Sheets

ROBOT SYSTEM, CONTROL APPARATUS, AND CONTROL METHOD FOR ROBOT

The present application is based on, and claims priority from JP Application Serial Number 2019-092676, filed May 16, 2019, the disclosure of which is hereby incorporated by reference herein in its entirety.

BACKGROUND

1. Technical Field

The present disclosure relates to a robot system, a control apparatus, and a control method for robot.

2. Related Art

Collaborative robots are robots that share work spaces with humans and perform work collaboratively with the humans.

For example, JP-A-2018-80941 discloses a collaborative robot fixed onto a floor part and performing collaborative work with a human. The collaborative robot is fixed via a fixation plate fixed onto the floor part and a force sensor provided on the fixation plate. The force sensor is a device that detects an external force acting on the robot, e.g. a force when a human contacts the robot. The robot is fixed onto the force sensor, and thereby, the contact between the human and the robot may be detected. Specifically, the force sensor converts the external force into an electrical signal and outputs a change of the external force as a change of the electrical signal. Further, regarding the force sensor, it is generally known that a phenomenon called temperature drift that the output value changes due to a temperature change occurs.

However, when a conduction state is continued immediately after power of the robot is turned on, the temperature of the force sensor gradually rises, and thereby, the temperature drift may occur and accuracy of collision detection of the robot may be lower.

SUMMARY

A robot system according to an application example of the present disclosure includes a robot collaboratively acting with a human, a force sensor provided in the robot and detecting a force, a control unit decelerating or stopping an action of the robot based on output from the force sensor, a first temperature sensor detecting a temperature of the force sensor, and an execution unit performing warm-up operation in the robot until output from the first temperature sensor reaches a first target value.

DESCRIPTION OF EXEMPLARY EMBODIMENTS

As below, preferred embodiments of a robot system, a control apparatus, and a control method for robot according to the present disclosure will be explained in detail with reference to the accompanying drawings.

1. First Embodiment

First, a robot system, a control apparatus, and a control method for robot according to the first embodiment will be explained.

Figure 1:
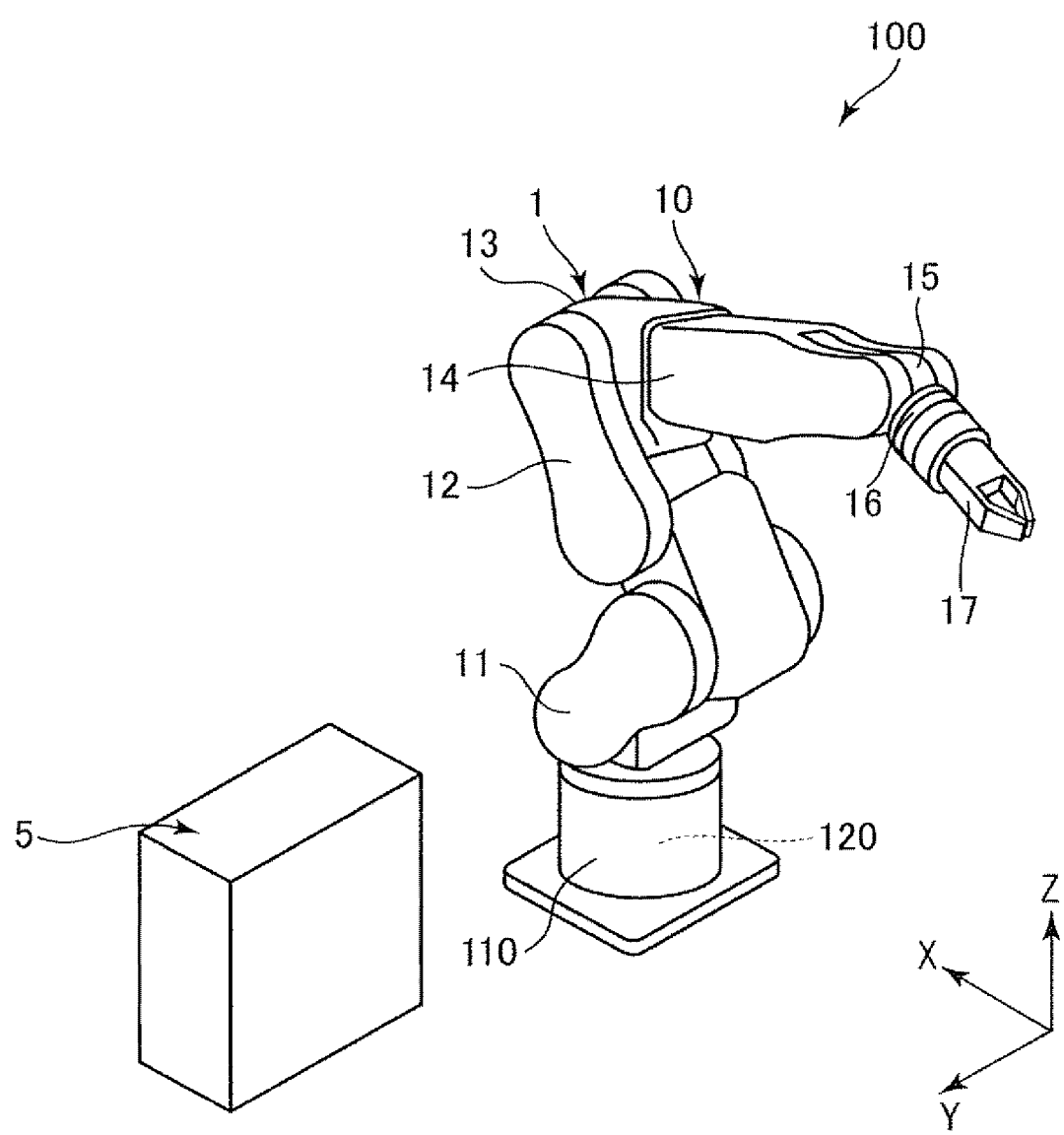
FIG. 1 shows a robot system according to a first embodiment.
Figure 2:
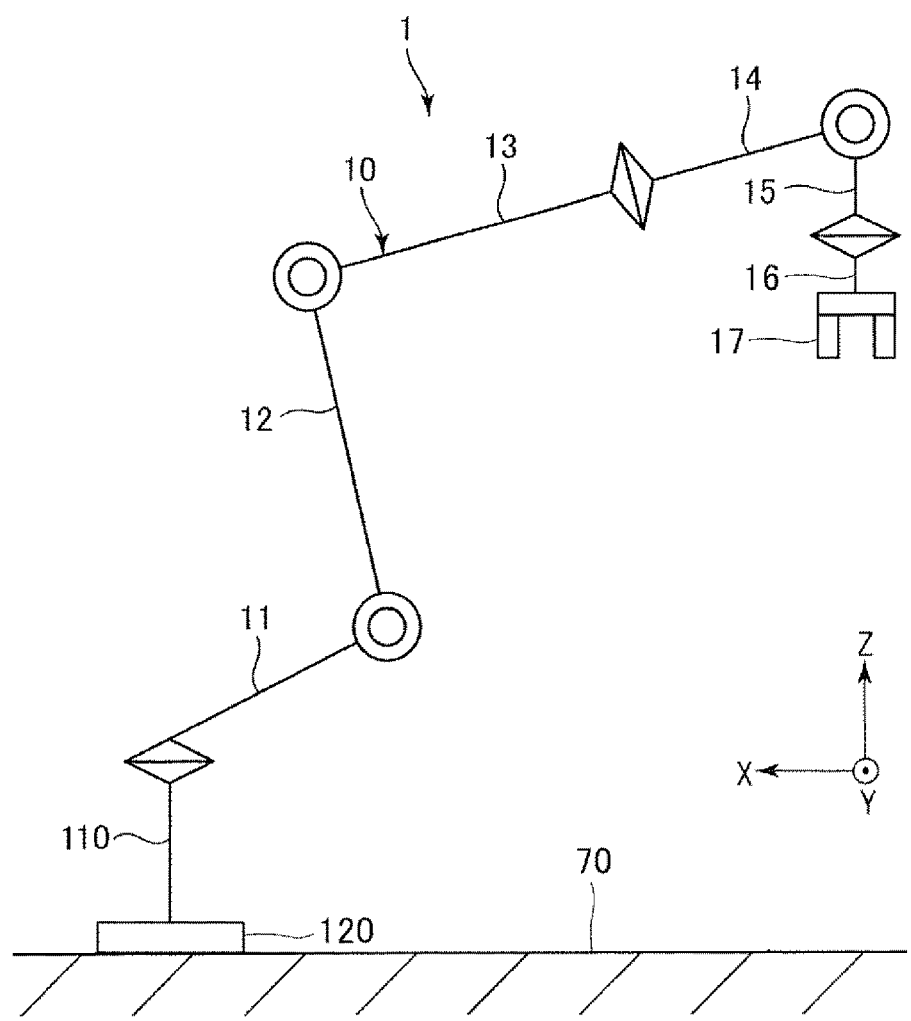
FIG. 2 is a schematic diagram of the robot system shown in FIG. 1.
Figure 3:
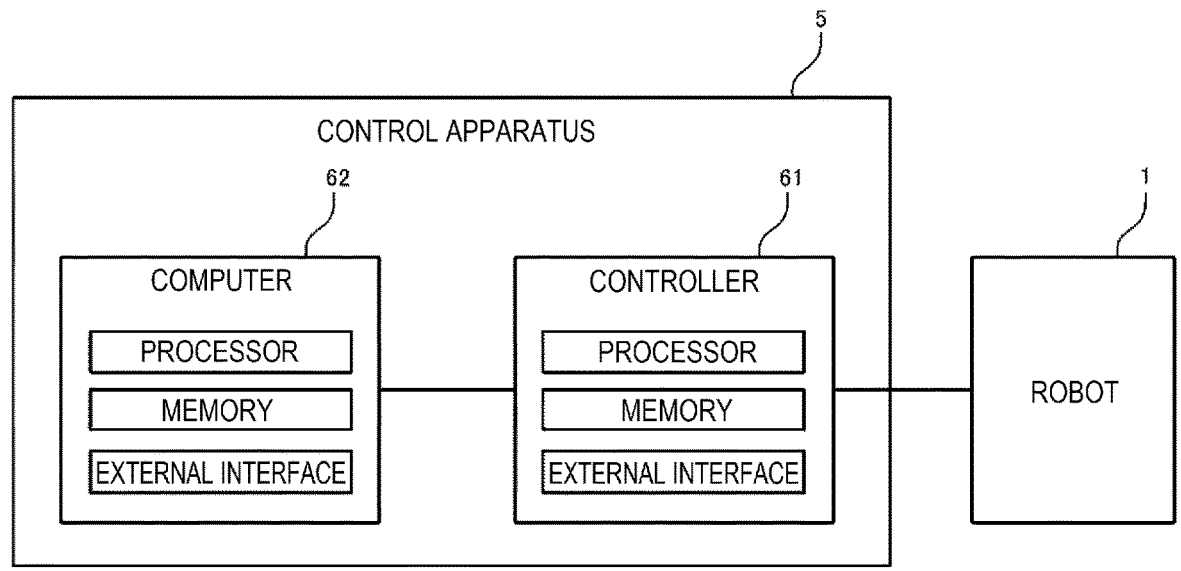
FIG. 3 is a block diagram showing an example of a hardware configuration of the robot system shown in FIGS. 1 and 2.
Figure 4:
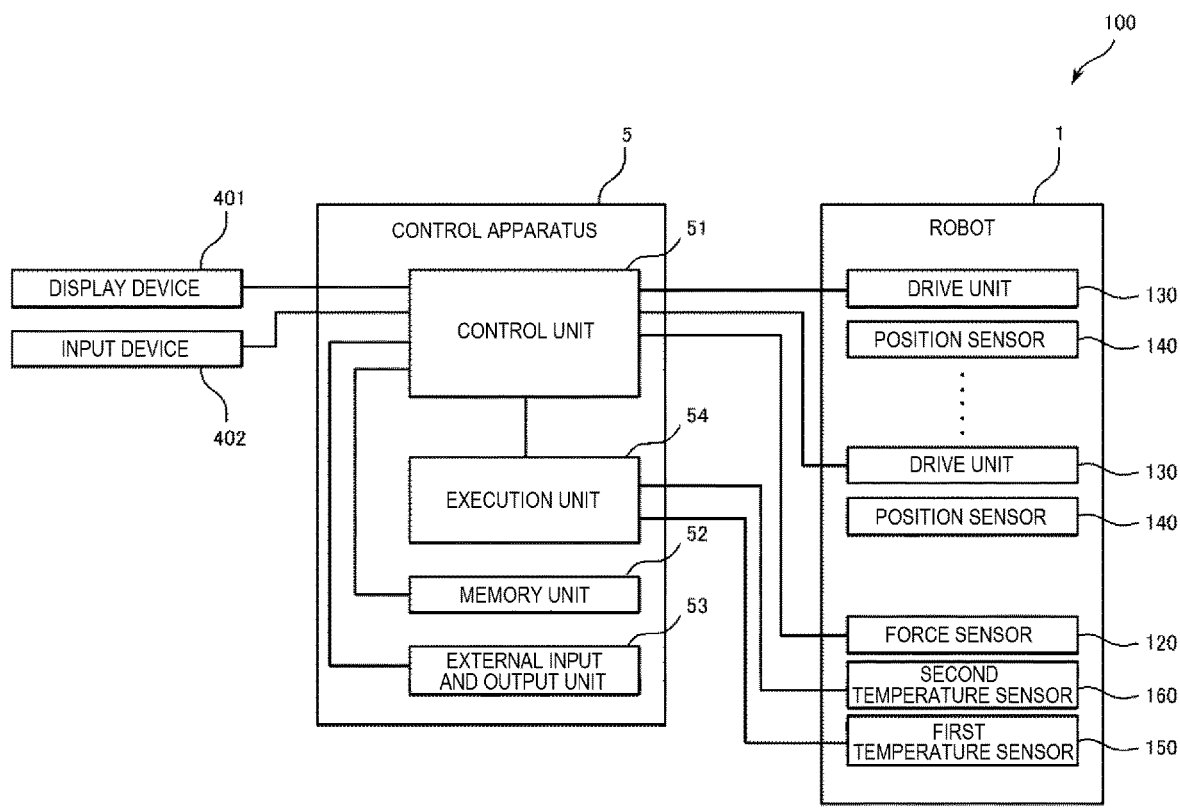
FIG. 4 is a functional block diagram for more detailed explanation of FIG. 3.

FIG. 1 shows the robot system according to the first embodiment. FIG. 2 is the schematic diagram of the robot system shown in FIG. 1. FIG. 3 is the block diagram showing the example of the hardware configuration of the robot system shown in FIGS. 1 and 2. FIG. 4 is the functional block diagram for more detailed explanation of FIG. 3.

Note that, in FIG. 1, an X-axis, a Y-axis, and a Z-axis are shown as three axes orthogonal to one another. Further, in this specification, "coupling" includes both direct coupling and indirect coupling via an arbitrary member.

1.1 Robot System

A robot system 100 shown in FIG. 1 is used for work including e.g. holding, conveying, and assembly of work objects. The robot system 100 has a robot 1, a control apparatus 5 that controls driving of the robot 1, a force sensor 120 that detects a force acting on the robot 1, a first temperature sensor 150 that detects the temperature of the force sensor 120, and a second temperature sensor 160 that detects the ambient temperature. These respective units can communicate in wired or wireless connection, and the communication may be made via a network like the Internet.

1.1.1 Robot

As shown in FIGS. 1 and 2, the robot 1 is the so-called six-axis vertical articulated robot, and has a base 110 and a robot arm 10 coupled to the base 110.

The base 110 is a part for attachment of the robot 1 to an arbitrary installation part. In the embodiment, the base 110 is placed on e.g. an installation part 70 formed by an X-Y plane shown in FIG. 2. Note that the installation part 70 for the base 110 is not limited to a floor or the like, but may be e.g. a wall, ceiling, a movable platform, or the like. The force sensor 120 is placed between the robot 1 and the installation part 70 and can detect a force acting on the robot 1.

As shown in FIGS. 1 and 2, the robot arm 10 has an arm 11, an arm 12, an arm 13, an arm 14, an arm 15, and an arm 16. These arms 11 to 16 are sequentially coupled from the proximal end side, i.e., the base 110 side toward the distal end side, i.e., the opposite side to the base 110. The respective arms 11 to 16 are pivotable relative to the adjacent arms or the base 110. For example, the arm 16 has a disc shape as shown in FIG. 1 and is pivotable relative to the arm 15.

As shown in FIG. 1, a gripping hand 17 that grips a work object is coupled to the distal end of the robot arm 10. Note that the gripping hand 17 is replaceable and a suction hand, magnet hand, screwing tool, engagement tool, or the like may be used in place of the gripping hand 17.

As shown in FIG. 4, the robot 1 has drive units 130 including motors (not shown) that pivot one arm relative to the other arm or the base 110 and reducers (not shown). As the motor, e.g. a servo motor such as an AC servo motor or DC servo motor may be used. As the reducer, e.g. a planet gear reducer, wave gearing, or the like may be used. Further, the robot 1 has position sensors 140 that detect the rotation angles of the rotation shafts of the motors or the reducers. For the position sensor 140, e.g. a rotary encoder or the like may be used. The drive units 130 and the position sensors 140 are provided in e.g. the base 110 and the respective arms 11 to 16 and, in the embodiment, the robot 1 has the six drive units 130 and the six position sensors 140. The respective drive units 130 are electrically coupled to the control apparatus 5 via e.g. motor drivers (not shown) provided inside of the robot 1. Further, the respective position sensors 140 are electrically coupled to the control apparatus 5 (not shown in FIG. 4).

In the robot 1, other arbitrary members, apparatuses, etc. may be provided. Specifically, for example, imaging units that image the work objects, the robot 1, or surrounding areas may be provided.

1.1.2 Control Apparatus

As shown in FIG. 4, the control apparatus 5 has a function of controlling driving of the robot 1 and is communicably coupled to the robot 1. The control apparatus 5 and the robot 1 may be coupled via wired connection or wireless connection. Further, a display device 401 (display unit) including e.g. a monitor or the like and an input device 402 including e.g. a keyboard or the like are coupled to the control apparatus 5.

As shown in FIG. 4, the control apparatus 5 includes a control unit 51, a memory unit 52, an external input and output unit 53, and an execution unit 54 that performs warm-up operation in the robot 1. The respective component elements of the control apparatus 5 are communicably coupled with one another via various buses.

The control unit 51 executes various programs etc. stored in the memory unit 52. Thereby, processing including control of driving of the robot 1, various kinds of calculations, and determinations may be realized. As an example, the control unit 51 has a function of decelerating or stopping the action of the robot 1 when determining that the robot 1 may collide with a human or object by the output from the force sensor 120. Thereby, the robot 1 may be prevented from colliding with a human or object and the impact may be relaxed.

In the memory unit 52, various programs that can be executed by the control unit 51 are stored. Further, in the memory unit 52, various kinds of data received by the external input and output unit 53 can be stored.

The external input and output unit 53 includes an external interface and is used for coupling among the robot 1, the display device 401, and the input device 402.

The execution unit 54 drives the drive units 130 via the control unit 51 and performs the warm-up operation. The warm-up operation refers to e.g. preliminary driving of the drive units 130 after the power of the robot system 100 is turned on and before the robot 1 transitions to normal operation. The heat generated in the drive units 130 in the warm-up operation is transferred to the force sensor 120 and the temperature of the force sensor 120 rises. Then, the warm-up operation is continued for a fixed time or more, and the temperature change of the force sensor 120 becomes smaller and eventually substantially constant. Thereby, the temperature drift of the force sensor 120 may be suppressed.

The actuation of the execution unit 54 will be described later in detail.

The hardware configuration of the control apparatus 5 is not particularly limited, but includes e.g. a controller 61 communicably coupled to the robot 1 and a computer 62 communicably coupled to the controller 61 as shown in FIG. 3.

Of the configuration, processors shown in FIG. 3 include e.g. CPUs (Central Processing Units), FPGAs (Field-Programmable Gate Arrays), and ASICs (Application Specific Integrated Circuits).

Memories shown in FIG. 3 include e.g. volatile memories such as RAMs (Random Access Memories) and nonvolatile memories such as ROMs (Read Only Memories). Note that the memories are not limited to the undetachable types, but may have detachable external memory devices.

External interfaces shown in FIG. 3 include various kinds of communication connectors. USBs (Universal Serial Bus) connectors, RS-232C connectors, wired LANs (Local Area Networks), wireless LANs, and the like are taken as examples.

Note that the control unit 51 and the execution unit 54 may be integrated in a single device in the hardware configuration.

In addition to the above described configuration, another configuration may be added to the control apparatus 5. Various programs, data, etc. stored in the memory unit 52 may be previously stored in the memory unit 52, stored in e.g. a recording medium such as a CD-ROM and provided from the recording medium, or provided via a network or the like.

1.1.3 Force Sensor

The force sensor 120 shown in FIG. 1 is provided inside of the base 110 of the robot 1. Thereby, forces acting on the gripping hand 17 and the robot arm 10 may be detected.

As the force sensor 120, a force sensor such as a six-axis force sensor or three-axis force sensor is preferably used. In the force sensor, a force may be accurately detected. Further, the magnitude and direction of the force may be detected, and thereby, for example, the directions in which the forces act on the gripping hand 17 and the robot arm 10 can be grasped. The force sensor 120 converts the detected force into an electrical signal and outputs the electrical signal to the control apparatus 5.

Figure 5:
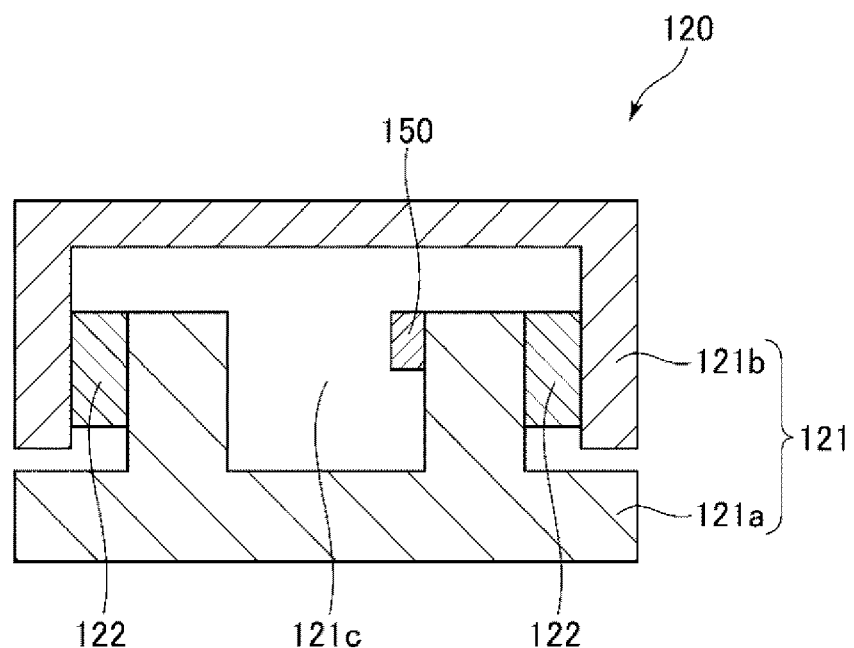
FIG. 5 is a sectional view showing an overview of a structure of a force sensor shown in FIG. 1.

FIG. 5 is the sectional view showing the overview of the structure of the force sensor 120 shown in FIG. 1.

The force sensor 120 shown in FIG. 5 has a housing 121 and force detection units 122 provided inside of the housing 121.

The housing 121 includes a first base portion 121a and a second base portion 121b placed at a predetermined distance from the first base portion 121a. The first base portion 121a and the second base portion 121b form the box-shaped housing 121. A space 121c is formed inside of the housing 121, and the plurality of force detection units 122 are housed in the space 121c.

The constituent materials of the first base portion 121a and the second base portion 121b include e.g. metal materials, ceramics materials, and resin materials.

The force detection units 122 are sandwiched between the first base portion 121a and the second base portion 121b. The force detection units 122 are formed by elements that generate electric charge when external forces are applied or the like. The specific example of the force detection unit 122 includes e.g. a piezoelectric element, and a piezoelectric element using quartz crystal is preferably used. When an external force acts on the force sensor 120, the second base portion 121b is displaced relative to the first base portion 121a and the force acts on the force detection units 122 and electric charge is generated. The electric charge is detected, and thereby, the magnitude and the direction of the force may be obtained.

A cause of the temperature drift in the force sensor 120 includes thermal expansion of the housing 121. In the force sensor 120, the force detection units 122 are fixed to the housing 121, and thus, when the housing 121 expands or contracts, the displacement transfers to the force detection units 122 and changes the output values. For example, immediately after the power of the robot system 100 is turned on, the temperature of the housing 121 is substantially equal to the ambient temperature and relatively low. However, when the drive units 130 are driven and the force sensor 120 is conducted, the temperature of the housing 121 rises. With the temperature rise, the housing 121 expands and the displacement allows forces to act on the force detection units 122. Thereby, in the force detection units 122, the forces not actually acting thereon are detected and the detection causes rises of the output values.

Accordingly, the robot system 100 according to the embodiment includes the first temperature sensor 150 that detects the temperature of the force sensor 120 and the execution unit 54 that performs warm-up operation in the robot 1 until the output from the first temperature sensor 150 reaches a first target value. Thereby, the temperature of the force sensor 120 is positively raised and reliability of the output from the force sensor 120 may be early secured.

Note that the output from the first temperature sensor 150 includes e.g. the temperature of the force sensor 120 detected by the first temperature sensor 150 or an amount of change per unit time in the temperature of the force sensor 120 detected by the first temperature sensor 150.

When the temperature of the force sensor 120 by the first temperature sensor 150 is used as the output from the first temperature sensor 150, a target temperature of the force sensor 120 is set as the first target value. In this case, the execution unit 54 monitors the detection value of the temperature of the force sensor 120 as the output from the first temperature sensor 150. Further, the execution unit 54 is configured to execute the warm-up operation until the detection value becomes equal to or larger than the first target value, that is, equal to or larger than the target temperature.

Note that the target temperature may be previously obtained from the historical performance. Specifically, the target temperature may be the lowest temperature of the force sensor 120 at which the output from the force sensor 120 starts to be stabilized, i.e., the lowest temperature of the force sensor 120 at which the temperature drift starts to be sufficiently suppressed after the power of the robot 1 is turned on, in the process in which the temperature of the force sensor 120 rises. By executing the warm-up operation until the temperature is reached, and thereby, the execution unit 54 secures reliability of the output from the force sensor 120.

On the other hand, the amount of change of the temperature of the force sensor 120 detected by the first temperature sensor 150 may be used as the output from the first temperature sensor 150. In this case, the amount of change per unit time in the temperature of the force sensor 120 is set as the first target value. Further, the execution unit 54 is configured to execute the warm-up operation until the amount of change per unit time becomes equal to or smaller than the first target value, that is, equal to or smaller than the target amount of change.

Note that the target amount of change may be previously obtained from the historical performance. Specifically, the target amount of change may be the amount of change per unit time of the temperature of the force sensor 120 when the output from the force sensor 120 starts to be stabilized after the power of the robot 1 is turned on, in the process in which the temperature of the force sensor 120 rises. That is, with the progress of the warm-up operation, the amount of change per unit time decreases, and thus, the amount of change when the output from the force sensor 120 starts to be stabilized may be set as the target amount of change.

Note that the output from the first temperature sensor 150 is not limited to those, but may be an arbitrary index relating to the temperature or an amount of change of the index. For example, an electrical signal is directly output from a sensor such as a thermistor and the temperature is obtained by conversion of the signal, however, the electrical signal (output value) itself may be used as an index. Specifically, a voltage signal output from the first temperature sensor 150 or an amount of change of the voltage signal may be used. Or, the output from the first temperature sensor 150 may be a calculation result after an arbitrary calculation is performed on the arbitrary index relating to the temperature in the execution unit 54.

The control unit 51 of the control apparatus 5 decelerates or stops the action of the robot 1 based on the output from the force sensor 120. The driving of the robot 1 may be controlled based on the output from the force sensor 120 with secured reliability. That is, the forces acting on the gripping hand 17 and the robot arm 10 may be detected more accurately, and thus, for example, the probability of false detection of collision despite the absence of collision of the gripping hand 17 or robot arm 10 with a human or object may be made lower and unnecessary deceleration or stoppage of the action of the robot 1 may be avoided.

1.1.4 First Temperature Sensor

The first temperature sensor 150 shown in FIG. 4 is provided in the space 121c inside of the housing 121 of the force sensor 120. Specifically, the force sensor 120 has the housing 121 and the force detection units 122 provided inside of the housing 121 as described above, and the first temperature sensor 150 is fixed to the inner wall surface of the housing 121 facing the space 121c. Thereby, the first temperature sensor 150 may detect and monitor the temperature in a position of the housing 121 closer to the force detection units 122. As a result, the stability of the output values from the force detection units 122 may be grasped with higher accuracy based on the output from the first temperature sensor 150.

As the first temperature sensor 150, e.g. a known temperature sensor such as a thermistor or thermocouple is used. From the first temperature sensor 150, an electrical signal indicating the detected temperature is input to the execution unit 54 of the control apparatus 5.

The position of the first temperature sensor 150 in the space 121c is not particularly limited, but may be a position close to the force detection units 122 as shown in FIG. 5 or apart from the units. Or, the first temperature sensor 150 may be outside of the housing 121.

Note that the robot system 100 may include a plurality of the first temperature sensors 150. For example, when the force sensor 120 includes the plurality of force detection units 122, the first temperature sensors 150 may be provided in correspondence with the respective force detection units 122.

1.1.5 Second Temperature Sensor

The second temperature sensor 160 shown in FIG. 4 is a sensor that detects the ambient temperature. The position where the second temperature sensor 160 is provided may be inside or outside of the exterior of the robot 1 as long as the sensor can detect the ambient temperature.

The execution unit 54 monitors the output from the second temperature sensor 160, i.e., the detection value of the ambient temperature. From the second temperature sensor 160, e.g. an electrical signal indicating the detected temperature is input to the execution unit 54 of the control apparatus 5.

Then, the execution unit 54 performs the warm-up operation based on not only the output from the first temperature sensor 150 but also the output from the second temperature sensor 160. Specifically, for example, the condition for ending the warm-up operation is changed according to the ambient temperature detected by the second temperature sensor 160. More specifically, in the embodiment, the warm-up operation is continued until the above described output from the first temperature sensor 150 reaches the first target value, and the first target value may be changed according to the ambient temperature. For example, when the ambient temperature is lower, the target temperature as the first target value is also set to be lower and, when the ambient temperature is higher, the target temperature as the first target value is also set to be higher. Thereby, the temperature change of the force sensor 120 with the influence by the ambient temperature may be reflected on the ending condition of the warm-up operation. As a result, the necessary length of the warm-up operation may be determined with higher accuracy based on the ambient temperature. Thereby, the warm-up operation may be ended in a shorter time and the normal operation may be started earlier.

Note that the second temperature sensor 160 may be provided as appropriate, or may be omitted.

1.1.6 Display Device and Input Device

The display device 401 shown in FIG. 4 includes a monitor and has a function of displaying various windows etc. Therefore, a worker may check the drive state of the robot 1 or the like via the display device 401.

The input device 402 includes e.g. a keyboard, keypad, or the like. Therefore, the worker operates the input device 402, and thereby, may give instructions of various kinds of processing etc. to the control apparatus 5. Note that the input device 402 may include e.g. a teaching pendant or the like (not shown).

In place of the display device 401 and the input device 402, a display input device having both of the functions of the display device 401 and the input device 402 may be used. As the display input device, e.g. a touch panel display or the like may be used. Further, the robot system 100 may have respective single display device 401 and input device 402 or pluralities of the devices.

As above, the robot system 100 according to the first embodiment is explained. The robot system 100 includes the robot 1 collaboratively acting with a human, the force sensor 120 provided in the robot 1 and detecting a force, the control unit 51 decelerating or stopping the action of the robot 1 based on the output from the force sensor 120, the first temperature sensor 150 detecting the temperature of the force sensor 120, and the execution unit 54 performing the warm-up operation in the robot 1 until the output from the first temperature sensor 150 reaches the first target value.

According to the robot system 100, for example, immediately after the power of the robot 1 is turned on, the execution unit 54 monitors the detection value of the temperature of the force sensor 120 and executes the warm-up operation until the detection value of the first temperature sensor 150 reaches a sufficient value. Accordingly, the reliability of the output from the force sensor 120 may be secured. Thereby, the warm-up operation in the minimum necessary length can be executed and the output from the force sensor 120 takes an accurate value, that is, the time until the temperature drift is resolved may be shortened. As a result, the probability of false detection in the force sensor 120 may be made lower and unnecessary deceleration or stoppage of the action of the robot 1 may be avoided.

Further, the control apparatus 5 according to the first embodiment is an apparatus that controls driving of the robot 1 collaboratively acting with a human including the control unit 51 provided in the robot 1 and decelerating or stopping the action of the robot 1 based on the output from the force sensor 120 detecting a force, and the execution unit 54 performing the warm-up operation in the robot 1 until the output from the first temperature sensor 150 detecting the temperature of the force sensor 120 reaches the first target value.

According to the control apparatus 5, for example, immediately after the power of the robot 1 is turned on, the warm-up operation is executed until the output from the first temperature sensor 150 satisfies a predetermined condition. Accordingly, the reliability of the output from the force sensor 120 may be secured. Thereby, the warm-up operation in the necessary length may be efficiently executed and the time until the temperature drift of the force sensor 120 is resolved may be shortened. As a result, the probability of false detection in the force sensor 120 may be made lower and unnecessary deceleration or stoppage of the action of the robot 1 may be avoided.

1.2 Control Method for Robot

Next, the control method for robot according to the first embodiment will be explained.

Figure 6:
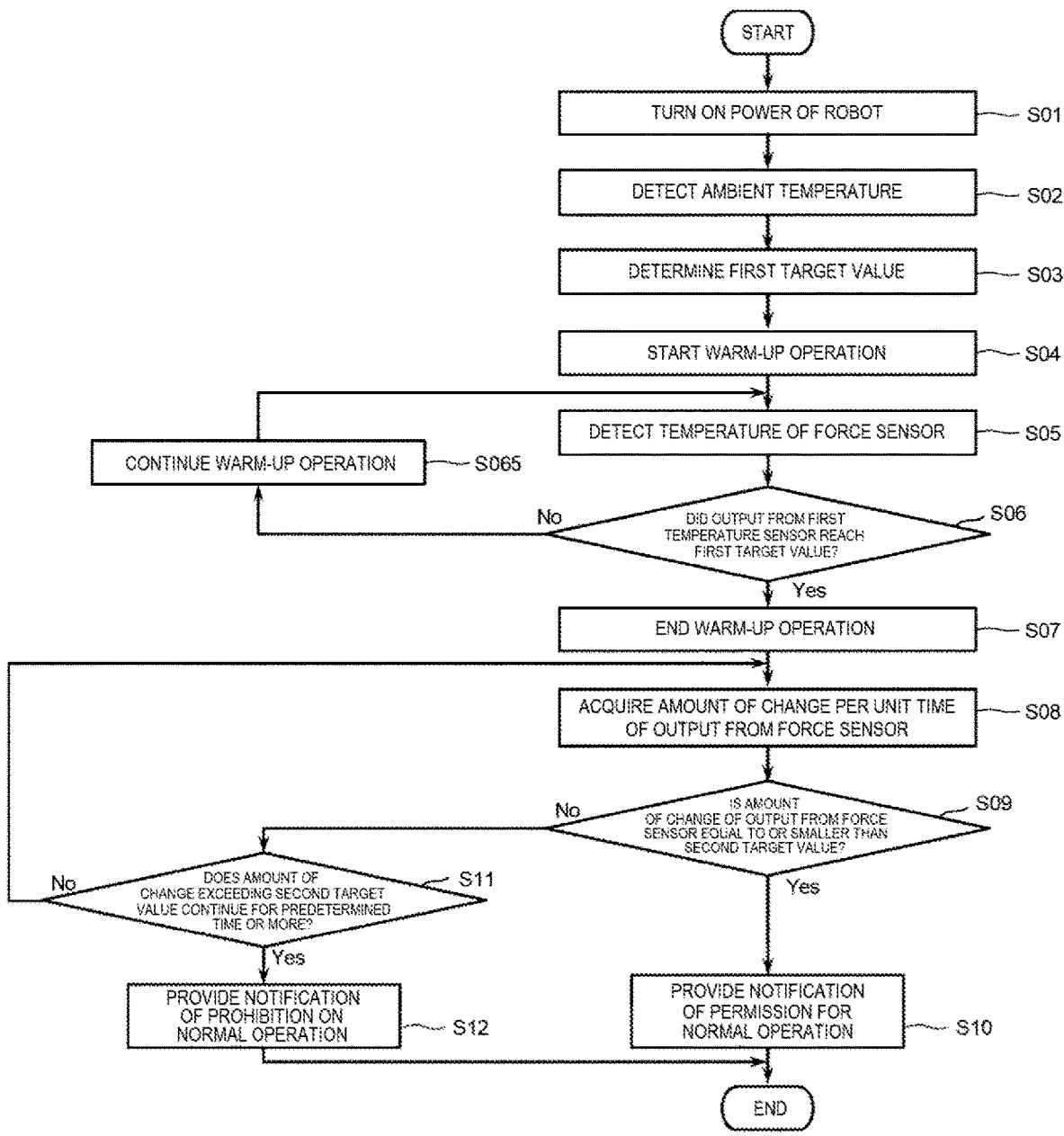
FIG. 6 is a flowchart showing a control method for robot by a control apparatus.

FIG. 6 is the flowchart showing the control method for the robot 1 by the control apparatus 5.

First, as step S01 shown in FIG. 6, the power of the robot 1 is turned on.

Then, as step S02 shown in FIG. 6, the ambient temperature is detected by the second temperature sensor 160. Note that, when the second temperature sensor 160 is omitted, the temperature detected by the first temperature sensor 150 may be used as the ambient temperature.

Then, as step S03 shown in FIG. 6, the first target value is determined. The first target value is the target value relating to the output from the first temperature sensor 150 as described above and a threshold value for ending the warm-up operation.

The first target value is determined based on the ambient temperature detected by the second temperature sensor 160. Note that the ambient temperature may be detected by another temperature sensor than the second temperature sensor 160 or first temperature sensor 150, e.g. a temperature sensor of the above described drive unit 130 or a temperature sensor of the gripping hand 17. The first target value is not particularly limited, but, as an example, is set to a higher temperature than the ambient temperature. More specifically, a value obtained by addition of from 1° C. to 70° C. to the ambient temperature may be taken as an example.

Or, the first target value may be determined based on another element than the ambient temperature. For example, the first target value may be an arbitrary fixed value or the first target value may be determined based on the ambient temperature predicted according to the date and time, area, or the like. The data may be stored in the memory unit 52 of the control apparatus 5.

Then, as step S04 shown in FIG. 6, the warm-up operation is started. The method of the warm-up operation is not particularly limited, but may be a method of leaving the power-on state of the robot 1, i.e., a method of raising the temperatures of the respective parts using resistance heat generation by conduction. Preferably, a method of driving the drive units 130 and using heat generation from the motors, reducers, or the like is used. In the case of the robot 1 shown in FIG. 6, it is preferable to preferentially drive the arm 11 closer to the force sensor 120. Thereby, the temperature of the force sensor 120 may be raised in a shorter time and the warm-up operation may be ended earlier.

Note that, in the warm-up operation, all of the six arms 11 to 16 may be driven. Thereby, warm-up operation of the robot arm 10 itself may be performed at the same time.

On the other hand, the robot 1 according to the embodiment has the robot arm 10 as described above, however, at the warm-up operation, the detection accuracy of the force by the force sensor 120 may be lower. Therefore, in the viewpoint, at the warm-up operation, it is preferable to impose a restriction on the driving of the robot arm 10. As an example of the restriction on the driving includes e.g. limitation of a drive range of the robot arm 10 and suppression of a drive speed thereof. Of the restrictions, suppression of the drive speed of the robot arm 10 is particularly effective. Specifically, at the warm-up operation, it is preferable that the control unit 51 has a plurality of modes with different maximum speeds as control modes for controlling the driving of the robot arm 10. More specifically, the control unit 51 has two modes having a magnitude relationship between speeds of a first mode in which the maximum speed of the robot arm 10 to be driven is a first speed and a second mode in which the maximum speed is a second speed lower than the first speed. In this case, it is preferable that the execution unit 54 selects the second mode using the control unit 51 while the execution unit 54 executes the warm-up operation.

Thereby, when the warm-up operation is executed, the robot arm 10 is driven in the control mode with the further suppressed maximum speed. As a result, if the robot arm 10 collides with an obstacle or the like during the warm-up operation, the impact may be suppressed to be smaller.

Then, as step S05 shown in FIG. 6, the temperature of the force sensor 120 is detected by the first temperature sensor 150. Then, the detection value by the first temperature sensor 150 is sent out to the execution unit 54 and a calculation is performed as necessary. Thereby, the output value of the first temperature sensor 150 is obtained.

Then, as step S06 shown in FIG. 6, whether or not the output from the first temperature sensor 150 has reached the first target value is determined. For example, in the case of the first target value is the target temperature of the force sensor 120 by the first temperature sensor 150, when the temperature of the force sensor 120 sufficiently rises and becomes equal to or larger than the target temperature, the process moves to step S07, which will be described later.

Note that the above described execution unit 54 may have a function of calculating the operation time of the warm-up operation based on the output from the first temperature sensor 150. The operation time is obtained based on e.g. parameters including the first target value relating to the output from the first temperature sensor 150 determined at step S03, the temperature of the force sensor 120 detected at step S05, and an elapsed time from the start of the warm-up operation at step S04 to the detection of the temperature at step S05. Specifically, the rate of rise of the temperature with the warm-up operation is obtained by division of a difference between the target temperature as the first target value and the detection temperature of the force sensor 120 by the elapsed time. Thereby, the time taken for the temperature of the force sensor 120 to reach the target temperature may be estimated, and the time may be set as the operation time of the warm-up operation.

The obtained operation time is displayed on the display device 401 (display unit) by e.g. the control unit 51. Thereby, a user of the robot system 100 may know the operation time of the warm-up operation, i.e., the time until the normal operation can be started. As a result, the user may efficiently perform prior work including e.g. preparation of a work object.

At step S07 shown in FIG. 6, the warm-up operation is ended. On the other hand, when the temperature of the force sensor 120 is lower than the target temperature, the process returns to before the above described step S05 through step S065 of determining that the warm-up operation is continued.

After step S07 ends, a determination that the sufficient warm-up operation was performed may be made. Accordingly, the normal operation may be started after step S07 ends.

On the other hand, to secure the reliability of the output from the force sensor 120 more sufficiently, step S08 to step S12, which will be described later, may be performed.

First, as step S08 shown in FIG. 6, in a state in which the robot arm 10 is at rest or a state in which the arm is driven at a constant velocity, the output from the force sensor 120 is monitored. Then, the amount of change per unit time is acquired with respect to the output from the force sensor 120.

Then, as step S09 shown in FIG. 6, whether or not the amount of change of the output from the above described force sensor 120 is equal to or smaller than a second target value is determined. The second target value is a threshold value as to whether or not the amount of change per unit time of the output is within an allowable range for control of the driving of the robot 1 using the output of the force sensor 120. That is, this step S09 is a step of determining whether or not the temperature drift of the force sensor 120 falls within an allowable range. Then, when the amount of change of the output from the force sensor 120 is equal to or smaller than the second target value, that is, when the temperature drift of the force sensor 120 falls within the allowable range, the process moves to step S10 to be described later.

At step S10 shown in FIG. 6, notification of permission for the normal operation is provided. The normal operation refers to e.g. operation of the robot 1 with release of the restriction on the driving of the robot arm 10 imposed at the warm-up operation. The notification of the permission for the normal operation is provided by e.g. display of the permission on the display device 401 using the control unit 51.

On the other hand, at step S09, when the amount of change of the output from the force sensor 120 is not equal to or smaller than the second target value, that is, when the temperature drift of the force sensor 120 does not fall within the allowable range, the process moves to step S11 to be described later.

At step S11 shown in FIG. 6, the duration time of the state in which the amount of change of the output from the above described force sensor 120 exceeds the second target value is calculated. Then, whether or not the duration time is equal to or more than a predetermined time is determined. The predetermined time refers to a time in which, when the amount of change of the output exceeds the second target value over a long time, no chance that the amount decreases equal to or smaller than the second target value may be determined from the historical performance or the like. When the duration time is equal to or more than the predetermined time, the process moves to step S12 to be described later. On the other hand, when the duration time is less than the predetermined time, the process moves to before the above described step S08.

At step S12 shown in FIG. 6, notification of a prohibition on the normal operation is provided. When the notification is issued, the control unit 51 does not permit the start of the normal operation. The notification of the prohibition on the normal operation is provided by e.g. display of the prohibition on the display device 401 using the control unit 51.

As described above, the control method for the robot 1 according to the embodiment is a control method of controlling the robot 1 collaboratively acting with a human including step S05 as a step of detecting the temperature of the force sensor 120 provided in the robot 1 and detecting a force by the first temperature sensor 150, and steps S06, S07 as steps of performing the warm-up operation in the robot 1 until the output from the first temperature sensor 150 reaches the first target value.

According to the control method, for example, immediately after the power of the robot 1 is turned on, the warm-up operation is executed until the detection value of the first temperature sensor 150 becomes a sufficient value. Accordingly, the reliability of the output from the force sensor 120 may be secured. Thereby, the warm-up operation in the necessary length may be efficiently executed and the time until the output of the force sensor 120 becomes an accurate value may be shortened. As a result, the probability of false detection in the force sensor 120 may be made lower and unnecessary deceleration or stoppage of the action of the robot 1 may be avoided.

2. Second Embodiment

Next, a robot system according to a second embodiment will be explained.

Figure 7:
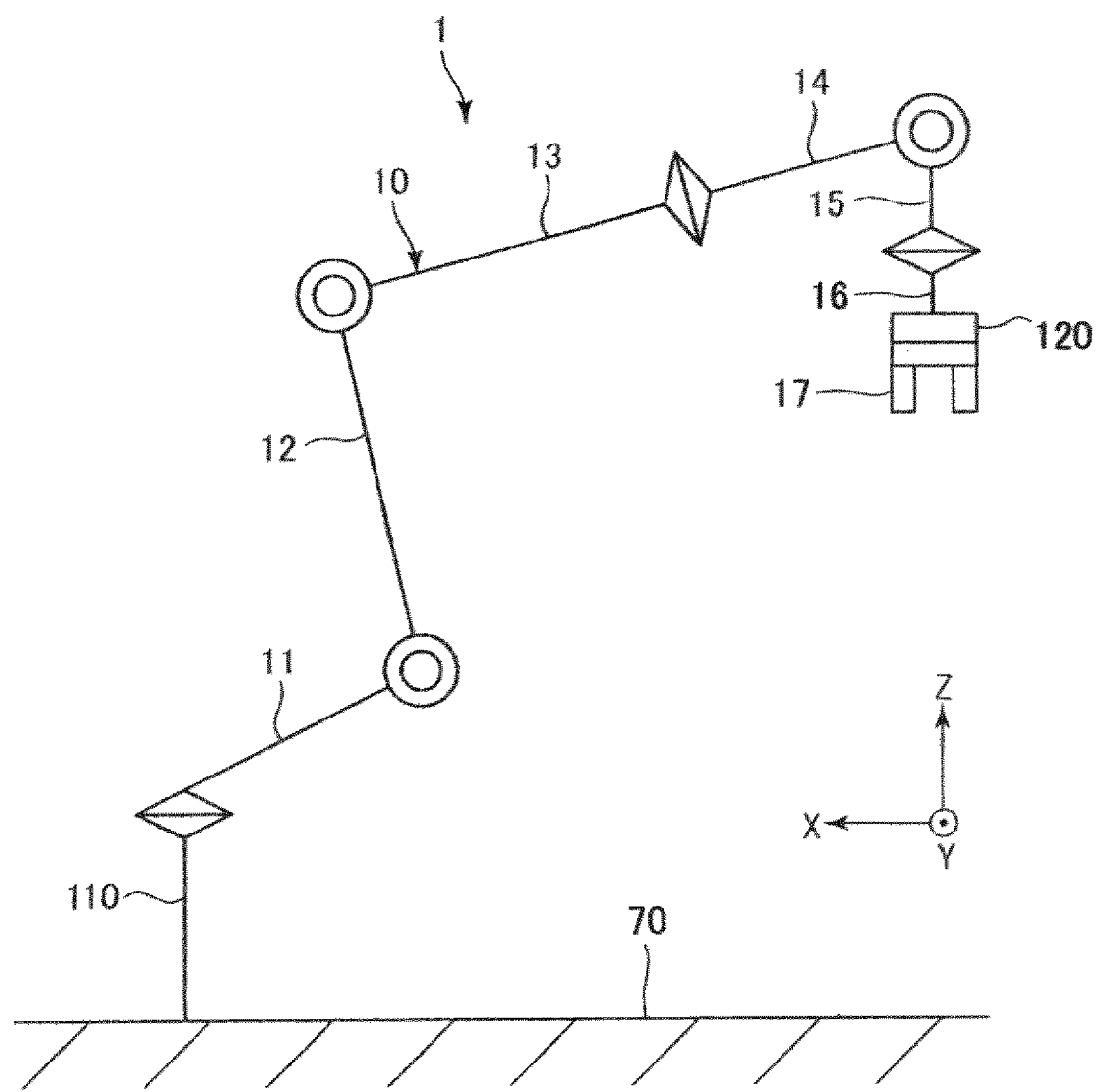
FIG. 7 is a schematic diagram of a robot system according to a second embodiment.

FIG. 7 is the schematic diagram of the robot system according to the second embodiment.

As below, the second embodiment will be explained, and the explanation will be made with a focus on the differences from the first embodiment and the explanation of the same items will be omitted. In FIG. 7, the same configurations as those of the first embodiment have the same signs.

The second embodiment is the same as the first embodiment except that the placement of the force sensor 120 is different. That is, in the above described first embodiment, the force sensor 120 is provided inside of the base 110, however, in the embodiment, the force sensor 120 is placed between the robot arm 10 and the gripping hand 17.

In the embodiment, the same effects as those of the first embodiment are obtained.

Further, when the force sensor 120 is provided in the position shown in FIG. 7, the method of the warm-up operation is the same as that of the first embodiment, however, it is preferable to particularly preferentially drive the arm 16 of the robot arm 10. Thereby, the temperature of the force sensor 120 may be raised in a shorter time and the warm-up operation may be ended earlier. The arm 16 is located at the distal end side of the robot arm 10 and has a smaller movable range, and thus, there is an advantage that safety is easily secured even when the arm is driven at a higher drive speed. Note that, in place of the warm-up operation by the robot arm 10, warm-up operation using driving of the gripping hand 17 may be performed. The gripping hand 17 has the particularly small movable range and lower output than the robot arm 10, and thereby, is useful in that safety is easily secured.

Furthermore, when the force sensor 120 is provided in the position shown in FIG. 7, the physical distances from the force sensor 120 to the arm 16 and the gripping hand 17 are smaller. Accordingly, the first temperature sensor 150 provided inside of the force sensor 120 in the first embodiment may be also used as the temperature sensor of the gripping hand 17 and the temperature sensor of the arm 16 in the embodiment. Thereby, the configuration of the robot system 100 may be simplified.

3. Third Embodiment

Next, a robot system and a control apparatus according to a third embodiment will be explained.

Figure 8:
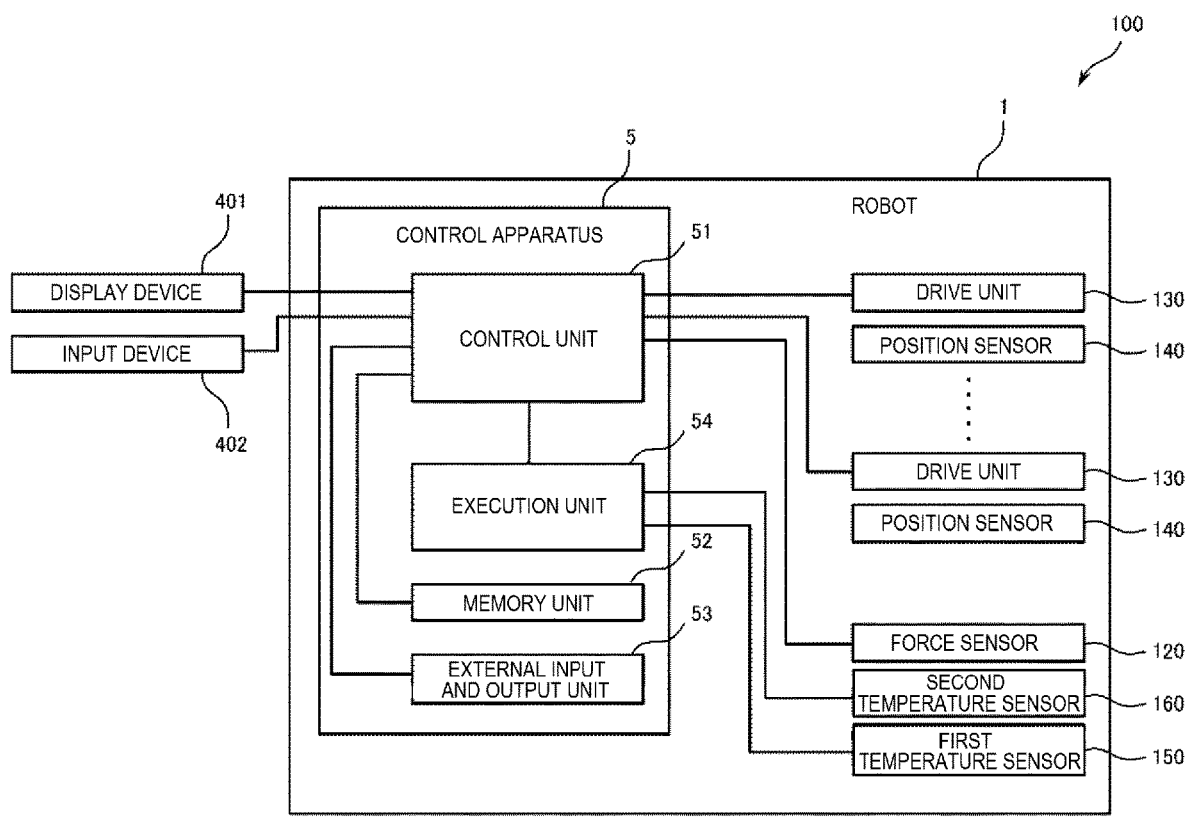
FIG. 8 is a functional block diagram of a robot system according to a third embodiment.

FIG. 8 is the functional block diagram of the robot system according to the third embodiment.

As below, the third embodiment will be explained, and the explanation will be made with a focus on the differences from the first embodiment and the explanation of the same items will be omitted. In FIG. 8, the same configurations as those of the first embodiment have the same signs.

The third embodiment is the same as the first embodiment except that the placement of the control apparatus is different. That is, in the above described first embodiment, the control apparatus 5 is placed outside of the robot 1, however, in the embodiment, as shown in FIG. 8, the control apparatus 5 is placed inside of the base 110 of the robot 1. In other words, the robot 1 has the base 110 and the robot arm 10 coupled to the base 110, and the control apparatus 5 including the control unit 51 and the execution unit 54 is placed inside of the base 110.

According to the robot system 100, it is not necessary to route wiring coupling between the robot 1 and the control apparatus 5 outside of the robot 1. Accordingly, the external wiring is less, and thereby, the cost may be reduced and the installation work of the robot system 100 may be made more efficient.

In the above described third embodiment, the same effects as those of the first embodiment are obtained.

4. Modified Example

Next, a robot system according to a modified example will be explained.

The control apparatus 5 according to the modified example has a function of recording a time in which the power of the robot 1 is off as a power-off time in the memory unit 52. During the power-off, heat dissipation of the robot 1 progresses and the temperature of the force sensor 120 gradually becomes lower. A constant correlation holds between the power-off time and the amount of the temperature reduction of the force sensor 120. Thus, the temperature when the power of the robot 1 is turned on again may be estimated using the power-off time and the temperature of the force sensor 120 recorded immediately before the power-off based on the correlation.

Therefore, accuracy of the output from the first temperature sensor 150 may be confirmed and the output value may be corrected using the estimated temperature. Thereby, the temperature of the force sensor 120 can be detected with higher accuracy.

Note that the power-off time may be recorded in a memory unit (not shown) of the robot arm 10, not in the memory unit 52. In this case, the power-off time may be associated with the robot arm 10. As a result, for example, even when the robot arm 10 and the control apparatus 5 are separated, the power-off time may be kept held. When the control apparatus 5 is coupled to the robot 1 again, the power-off time held in the robot arm 10 may be read from the control apparatus 5 and used.

As above, the robot system, the control apparatus, the control method for robot according to the present disclosure are explained based on the illustrated embodiments and the modified example of the robot system and the control apparatus, however, the present disclosure is not limited to those. The configurations of the respective parts may be replaced by arbitrary configurations having the same functions. For example, in this application, the robot of the robot system is the six-axis vertical articulated robot, but not limited to this, may be a horizontal articulated robot. Further, the number of axes of the vertical articulated robot may be less or more than six. Furthermore, another arbitrary configuration may be respectively added to the embodiments of the robot system and the modified example thereof and the embodiments of the control apparatus and the modified example thereof. Moreover, a step for an arbitrary purpose may be added to the embodiment of the control method for robot.

What is claimed is:

1. A robot system comprising:
 a robot collaboratively acting with a human;
 a force sensor provided in the robot and detecting a force;
 a controller decelerating or stopping an action of the robot based on output from the force sensor;
 a first temperature sensor detecting a temperature of the force sensor; and
 a processor performing warm-up operation in the robot until output from the first temperature sensor reaches a first target value, wherein
 the robot has an arm,
 the controller has a first mode in which a maximum speed of the arm is a first speed and a second mode in which the maximum speed is lower than the first speed as control modes for controlling driving of the arm, and
 the processor selects the second mode using the controller during the warm-up operation.

2. The robot system according to claim 1, further comprising a second temperature sensor detecting an ambient temperature, wherein the processor performs the warm-up operation based on the output from the first temperature sensor and output from the second temperature sensor.

3. The robot system according to claim 1, wherein the output from the first temperature sensor is a detection value of the temperature of the force sensor.

4. The robot system according to claim 1, wherein the output from the first temperature sensor is an amount of change per unit time in the temperature of the force sensor.

5. The robot system according to claim 1, wherein the force sensor has a housing and a force detection unit provided inside of the housing, and the first temperature sensor is provided inside of the housing.

6. The robot system according to claim 1, wherein the robot has a base and an arm coupled to the base, and the processor and the controller are placed inside of the base.

7. The robot system according to claim 1, wherein the processor calculates an operation time of the warm-up operation based on the output from the first temperature sensor, further comprising a display displaying the operation time.

8. A control apparatus that controls a robot collaboratively acting with a human, the robot having an arm, comprising:
 a controller decelerating or stopping an action of the robot based on output from a force sensor provided in the robot and detecting a force; and
 a processor performing warm-up operation in the robot until output from a first temperature sensor detecting a temperature of the force sensor reaches a first target value, wherein
 the controller has a first mode in which a maximum speed of the arm is a first speed and a second mode in which the maximum speed is lower than the first speed as control modes for controlling driving of the arm, and
 the processor selects the second mode using the controller during the warm-up operation.

9. A control method of controlling a robot collaboratively acting with a human, the robot having an arm, comprising:
 detecting a temperature of a force sensor provided in the robot and detecting a force using a first temperature sensor;
 performing warm-up operation in the robot until output from the first temperature sensor reaches a first target value, and
 controlling driving of the arm to be in a first mode in which a maximum speed of the arm is a first speed or a second mode in which the maximum speed is lower than the first speed, wherein
 the second mode is used during the warm-up location.

* * * * *